United States Patent [19]

Nemeth et al.

[11] 4,402,894

[45] Sep. 6, 1983

[54] PRODUCTION OF A CERAMIC RESISTOR

[75] Inventors: Joseph Nemeth, Detroit; Frank J. Russell, Yale, both of Mich.

[73] Assignee: Champion Spark Plug Company, Toledo, Ohio

[21] Appl. No.: 337,188

[22] Filed: Jan. 5, 1982

Related U.S. Application Data

[60] Continuation-in-part of Ser. No. 159,885, Jun. 16, 1980, abandoned, which is a division of Ser. No. 942,375, Sep. 14, 1978, abandoned.

[51] Int. Cl.$^3$ .......... C04B 33/32

[52] U.S. Cl. .......... 264/56; 264/310; 264/336

[58] Field of Search .......... 425/78, 193, 195, 345, 425/353, 354, 355, 418; 264/56, 310, 336

[56] References Cited

U.S. PATENT DOCUMENTS

| | | | |
|---|---|---|---|
| 2,305,877 | 12/1942 | Klingler | 264/336 |
| 3,118,183 | 1/1964 | Gex et al. | 18/20 |
| 3,959,184 | 5/1976 | Nemeth | 252/521 |
| 4,185,061 | 1/1980 | Hintor | 264/56 |

*Primary Examiner*—James H. Derrington

*Attorney, Agent, or Firm*—John C. Purdue

[57] ABSTRACT

An improved method for producing a ceramic resistor is disclosed. The method comprises the steps of charging ceramic batch into a longitudinally extending die, pressing the batch in the die between opposing plungers, removing one plunger from the die, ejecting the blank by moving the other plunger relative to the blank and firing the blank. The improvement constitutes imparting rotational motion to the removable plunger as applied pressure thereon is being released to remove the plunger from the die, whereby the surface of the plunger in contact with the blank separates therefrom without sticking.

1 Claim, 2 Drawing Figures

PRODUCTION OF A CERAMIC RESISTOR

REFERENCE TO RELATED APPLICATIONS

This is a continuation in part of application Ser. No. 159,885, filed June 16, 1980, now abandoned, which application was a division of application Ser. No. 942,375, filed Sept. 14, 1978, now abandoned.

BACKGROUND OF THE INVENTION

This invention relates to an improvement in a method for producing ceramic pellet. The method comprises the steps of charging ceramic batch into a longitudinally extending die, pressing the batch in the die between opposing plungers, removing one plunger from the die, ejecting the blank by means of the other plunger and firing the blank. A rotary press has been used to press the ceramic batch by the method described above. The rotary press comprises a plurality of longitudinally extending dies for receiving ceramic batch, means comprising upper and lower opposed plungers for pressing the batch in each of the dies, one of each of the opposed plungers being removable from the die, and the other being movable relative to the blank to eject the latter from the die. The apparatus also includes a rotating table die carrier for the plurality of dies, means at a pressing rotational position of the table for supporting the lower plunger against downward movement, and for driving the upper plunger downwardly to press batch in the die.

In accordance with the instant invention, it was desired to produce a ceramic resistor made of strontium-alumina-copper material disclosed in U.S. Pat. No. 3,959,184, granted May 25, 1976 to Joseph Nemeth. This material, after pressing and firing, should constitute a ceramic resistor with a series resistance between 21K and 38K ohms. Such a resistor is useful as an insert in the bore of a spark plug insulator to suppress electromagnetic interference. After the ceramic resistor material had been pressed in accordance with the method previously described for pressing ceramic batch, that portion of the material in contact with the surface of the removable plunger stuck to the surface as the plunger separated from the material when being removed from the die. As a consequence of the sticking, a majority of the ceramic blanks, after firing, had resistance values which were much higher than 38K ohms.

BRIEF DESCRIPTION OF THE INVENTION

The instant invention is based upon the discovery of a method which involves imparting rotational motion to the removable plunger as the applied pressure thereon is being released to remove the plunger from the die. The shearing action effected by the rotation causes the surface of the plunger in contact with the ceramic resistor blank to separate therefrom without sticking. The method of the instant invention is practiced in apparatus for producing a ceramic blank with an improvement designed to impart the rotational motion to the removable plunger. The improvement constitutes a stationary resilient finger and means mounting the finger so that it comes in contact with each plunger as the plunger is being moved by the rotating table away from the pressing position, and as the applied pressure thereon is being released to impart a sharp rotational movement to the plunger relative to the pressed batch. The shearing action effected by the rotation ensures a clean separation of the blank from the plunger. As a consequence of the clean separation, ceramic resistor blanks pressed in accordance with the improvement of the instant invention, after firing, can be produced so that, consistently, they have resistance values between 21K and 38K ohms.

OBJECTS OF THE INVENTION

It is an object of the invention to provide an improved method for producing a ceramic resistor.

Other objects and advantages will be apparent from the description which follows, reference being made to the accompanying drawings.

DETAILED DESCRIPTION OF THE INVENTION

Figure 1:
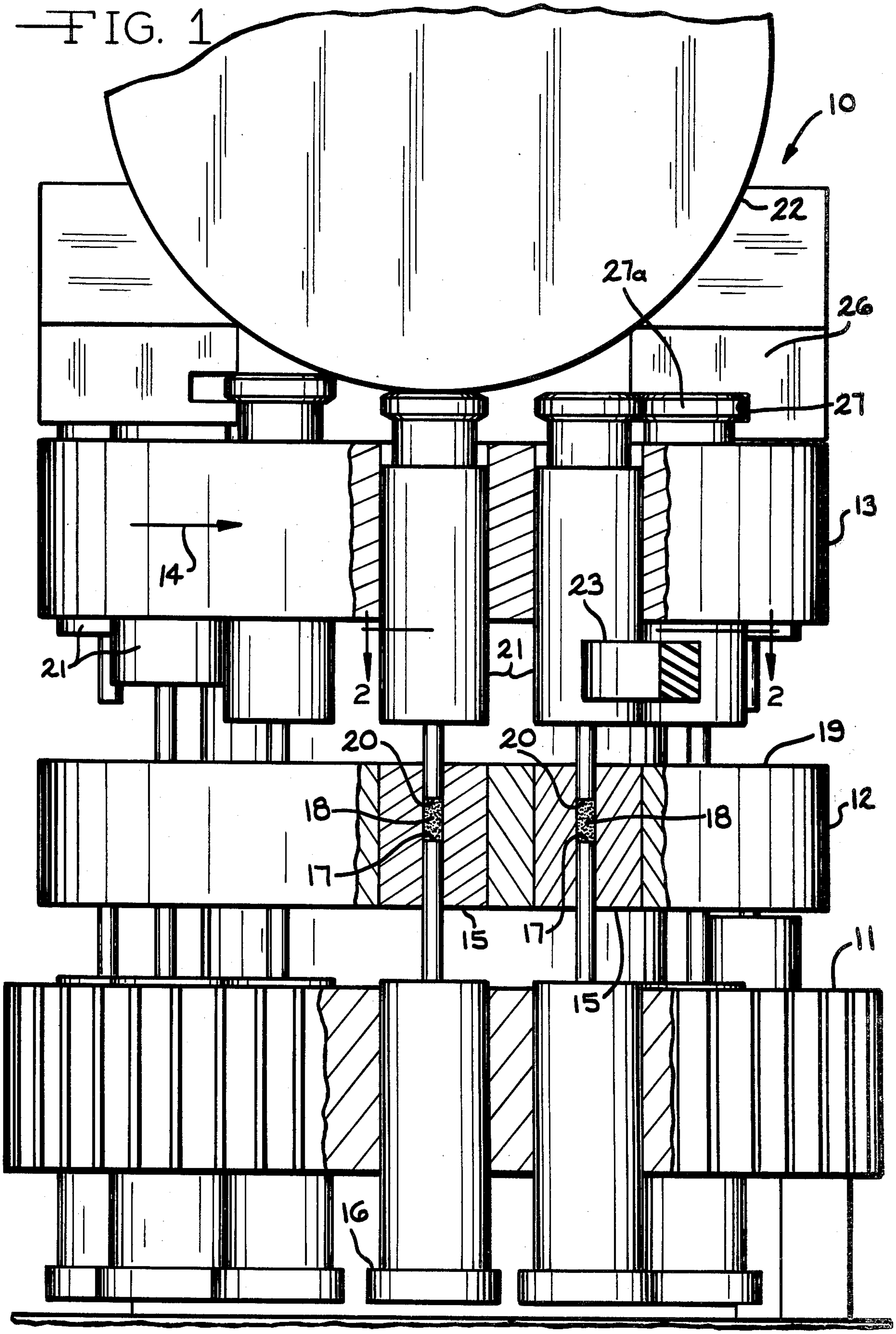
FIG. 1 is a partially schematic view in vertical elevation of a rotary press, with parts broke away to show details of two dies containing ceramic resistor batch compressed between opposing plungers.

Referring now in more detail to the drawings, and, in particular, to FIG. 1, a rotating table pelletizing press is indicated generally at 10. The press 10 comprises a driving gear 11, a rotating table die carrier 12 and a plunger carrier 13 all mounted on a journalled, vertically extending shaft (not illustrated) for rotation in the direction of an arrow 14. The die carrier 12 carries a plurality of dies 15, two of which are shown in FIG. 1. The driving gear 11 also serves as a plunger carrier, carrying a lower plunger 16 for each die 15. The lower plungers 16 are movable vertically upwardly from the position shown where an upward plunger surface 17 constitutes the bottom of a die cavity 18 in each of the dies 15 to a position where the upper plunger surface 17 is substantially flush with the upper surface 19 of the die carrier 12. Lower plunger surfaces 20 of upper plungers 21 constitute the upper surfaces of the die cavities 18 in the portion of the press 10 shown in FIG. 1. The upper plungers 21 are movable vertically upwardly in the plunger carrier 13 from the position shown to a position sufficiently far above the upper surface 19 of the die carrier 12 that a pellet which has been formed in one of the die cavities 18 can be ejected from its die 15 by movement of the associated lower plunger 16 to a position where its upper plunger surface 17 is substantially flush with the upper surface 19 of the die carrier 12.

Figure 2:
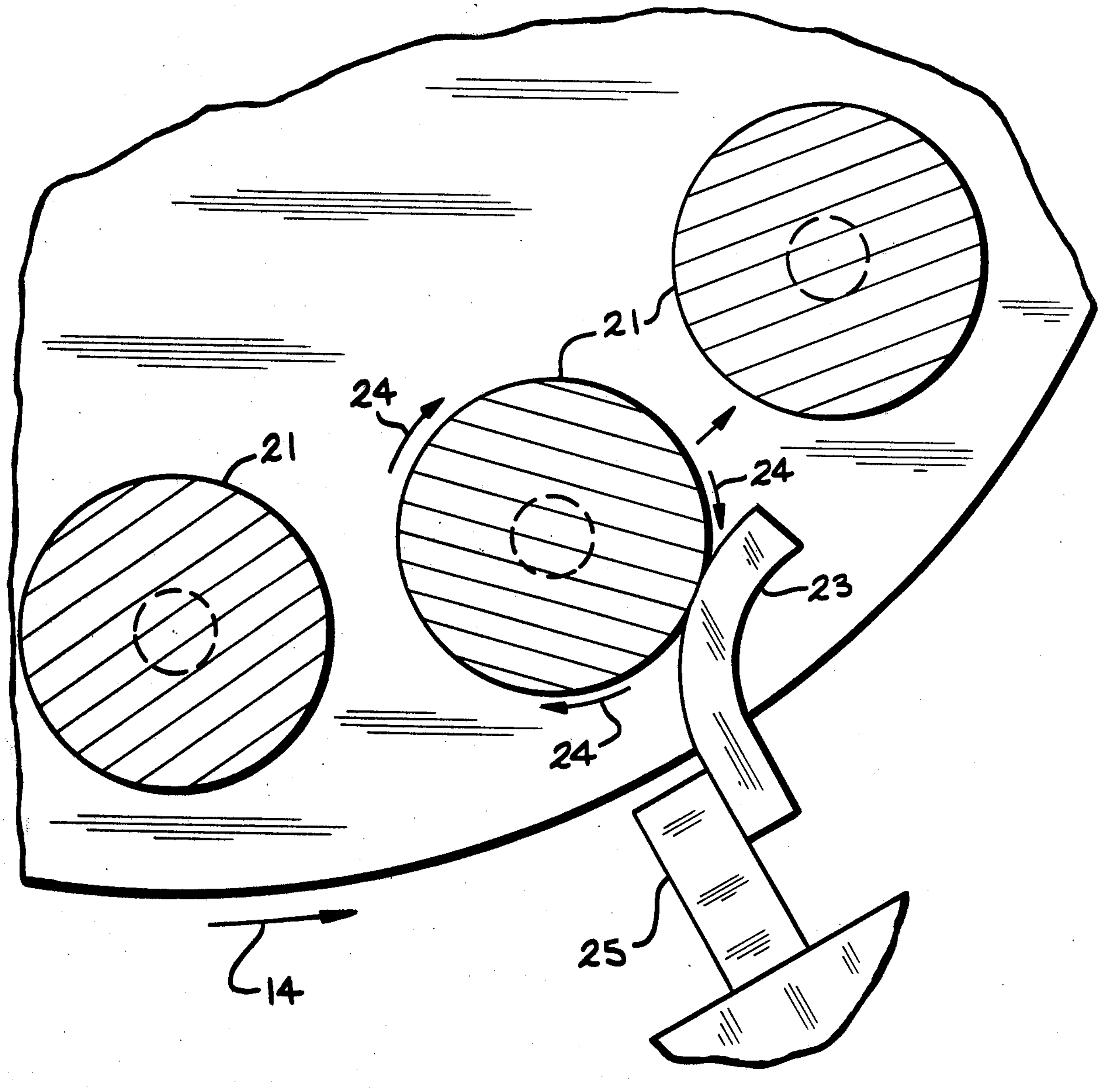
FIG. 2 is a partially schematic sectional view through three plungers of the rotary press taken on the line 2—2 of FIG. 1.

During operation of the press 10, the driving gear 11 is driven by a powered gear (not illustrated) causing rotation of the gear 11, of the die carrier 12 and of the plunger carrier 13 in the direction of the arrow 14. At one station (not illustrated) where the upper plunger surface 17 is at substantially the position shown in FIG. 1 and the lower plunger surface 20 is withdrawn substantially above the upper surface 19 of the die carrier 12, a powdered material to be compacted is injected into the die cavity 18. The material to be compacted can be a strontium-aumina-copper material disclosed in U.S. Pat. No. 3,959,184 which, after firing, constitutes a ceramic resistor useful as an insert in the bore of a spark plug insulator to suppress electromagnetic interference. Successive ones of the dies 15 are charged as described as rotation of the die carrier 12 brings them to the charging station. Further rotation of the die carrier 12 brings the charges dies 15 successively to the station shown at the left in the sectioned portion of FIG. 1 of the drawing. At this station, a cam 22 forces the aligned one of the upper plungers 21 downwardly to the position shown, thus causing compaction of the powdered material in the die cavity 18 to form a pellet. Further rotation of the die carrier 12 in the direction of the arrow 14 brings the upper plunger 21 shown on the left in FIG. 1 into contact with a resilient finger 23, causing rotation of that plunger, as well as rotation of subsequently engaged ones of the upper plungers 21. This rotation is in the direction of arrows 24 (FIG. 2) and occurs as cam pressure on the rotated upper plunger 21 is being released. The shearing action effected by the rotation of the upper plungers 21 causes the lower plunger surface 20 in contact with the pellet to separate therefrom without sticking. The resilient finger 23 is held in a stationary position as the plunger carrier 13 (FIG. 1) rotates with the die carrier 12 and the driving gear 11 in the direction of the arrow 14 (FIGS. 1 and 2). The support for the finger 23 is a bracket 25 to which the resilient finger 23 is attached.

After cam pressure on the upper plunger 21 has been released, it is moved vertically upwardly by a cam in a guide 26 from the position shown in FIG. 1 to a position sufficiently far above the upper surface 19 of the die carrier 12 to allow the pellet to be ejected from its die 15 by movement of the associated lower plunger 16. A plunger 21*a* is shown in FIG. 1 entering a slot 27 in the guide 26. The lower surface of the slot 27 is the cam which causes the upward movement of the plunger 21. As the lower plunger 16 moves vertically upwardly, it can be similarly rotated to cause its upper plunger surface 17 in contact with the pellet to separate therefrom without sticking. However, such rotation is not necessary for the material disclosed herein.

In accordance with the instant invention, ceramic resistor material, of the type disclosed in U.S. Pat. No. 3,959,184, was injected into the die cavity 18. The material was compacted between the upper plunger surface 17 and the lower plunger surface 20 and, as cam pressure on the upper plunger 21 was being released, the resilient finger 23 caused rotation of that plunger. Ceramic resistor blanks were pressed in accordance with the above-described method and, thereafter, they were suitably fired to produce ceramic resistors. It was determined by testing that at least 90% of the resistors of a particular size so produced had resistance values between 21K and 38K ohms. Moreover, it was found that the process could be practiced continuously for extended periods of time without need for interruption.

For purposes of comparison, but not in accordance with the instant invention, the procedure described in the preceeding paragraph was repeated, but without rotation of the upper plunger 21. It was found by testing that over 50% of the ceramic resistors so produced had resistance values in excess of 100K ohms and, consequently, were not suitable for use as inserts in the bores of spark plug insulators to suppress electromagnetic interference. In addition, it was found that, when the plunger was not rotated, after twenty-two minutes, on the average, of operation, cleaning of the dies and plungers of the press was necessitated by accumulations of material thereon. The cleaning operation required, on the average, eight and one half minutes, or 28% of the available production time.

It will be apparent that various changes may be made in details of construction from those shown in the attached drawings and discussed in connection therewith without departing from the spirit and scope of this invention as defined in the appended claims. It is, therefore, to be understood that this invention is not limited to the specific details shown and described.

What we claim is:

1. In a method for producing a ceramic resistor which method comprises charging ceramic resistor batch into a longitudinally extending die, pressing the ceramic resistor batch in the die between opposing plungers, removing a first plunger to form a blank from the die, moving a second plunger to eject the blank from the die and firing the blank, the improvement of imparting rotational motion to the first plunger as the applied pressure thereon is being released preparatory to removing the first plunger from the die, whereby the surface of the first plunger is rotated relative to the blank and separates therefrom without sticking.

* * * * *